United States Patent Office 3,645,926
Patented Feb. 29, 1972

3,645,926
STABILIZED, SELF-EXTINGUISHING LATEX FOAM RUBBER
Alfred Norman Dunlop, Windsor, Ontario, Canada, assignor to Polymer Corporation Limited, Sarnia, Ontario, Canada
No Drawing. Continuation of application Ser. No. 704,507, Feb. 12, 1968. This application Oct. 29, 1970, Ser. No. 85,219
Claims priority, application Canada, Feb. 18, 1967, 983,202
Int. Cl. C08f 47/10, 15/26, 37/18
U.S. Cl. 260—2.5 L
5 Claims

ABSTRACT OF THE DISCLOSURE

By employing a latex blend having at least 60% solids, which is prepared by:

(a) blending (1) a latex of a resinous vinylidene halide copolymer having ethylenic unsaturation with (2) a latex of a rubbery diolefinic hydrocarbon/vinylidene chloride copolymer,
(b) subjecting this latex blend to coagglomeration treatment,
(c) adding additional resinous latex (1) such that the total halogen of the contained polymers is of the order of 38%,
(d) concentrating this final latex to a solids content of at least 60% yet a viscosity of no more than 12 poise when at 60% solids, and
(e) compounding, foaming, gelling and vulcanizing the concentrated blend, there is produced a flame-retardant foam rubber composition.

---

This application is a continuation of application Ser. No. 704,507, filed Feb. 12, 1968, and now abandoned.

This invention relates to a process for producing latex foam rubbers and more particularly to latex foam rubbers which will not propagate combustion when the source of combustion has been removed.

Processes for producing latex foam rubbers are well known and include generally the steps of compounding a high solids latex with fillers, curatives, frothing agents etc., then foaming, irreversibly gelling and curing the gelled foam. Considerable variation is possible. There has been an increasing need for foam rubbers which are not only flexible and resilient, but which are also flame-retardant. Such materials are needed to provide the degree of safety required in uses such as cushioning in furniture and mattresses, and in insulation applications. While most organic materials will burn if subjected to a high enough temperature for a sufficient length of time, there is nevertheless considerable variation in the degree of ability to resist propagation of a flame. Thus, in applications such as the foregoing, it is desirable to employ foam rubbers which resist burning when contacted with a flame and which do not burn when the flame source has been removed.

In our copending United States application No. 487,-902 there is described and claimed such a flame-retardant latex foam rubber containing vinylidene halide homopolymer. The foams of the copending application suffer the disadvantage that they do not have good heat or U.V. stability, losing hydrogen halide and discoloring. It has now been found that by replacing the homopolymer of vinylidene halide by a resinous copolymer of a major proportion of vinylidene halide and a minor proportion of an ethylenically unsaturated copolymerizable monomer, a flame-retardant foam is produced which has improved heat and U.V. stability.

The flame-retardant latex foam rubber of the present invention is prepared by blending (1) an aqueous latex of particles of a resinous copolymer of a major proportion of vinylidene halide and a minor proportion of at least one ethylenically unsaturated copolymerizable monomer with (2) and aqueous latex obtained by mixing (a) an aqueous latex of particles of a rubbery copolymer of an open chain conjugated diolefin hydrocarbon compound and a vinylidene halide with (b) an aqueous latex of particles of a resinous copolymer of a major proportion of a vinylidene halide and a minor proportion of at least one ethylenically unsaturated copolymerizable monomer and coagglomerating the particles of latices (a) and (b), concentrating the blend of latices (1) and (2) to a 12 poise solid content of at least 60%, and then subjecting the concentrated blend to compounding, foaming, gelling and vulcanization steps to obtain the foam rubber. To obtain suitable latex foam rubbers with flame retardance, the total halogen content of the polymers in the foam rubber should be between 30 and 43 weight percent and preferably about 38 weight percent of the total polymers in the rubber.

The monomer copolymerizable with the vinylidene chloride is generally one containing a terminal $CH_2$=C< group and is particularly of the type

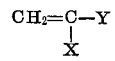

wherein X is hydrogen or a lower alkyl group containing from 1 to 6 carbon atoms, preferably methyl and Y is —CN or —COOZ where Z is hydrogen or a lower alkyl group containing from 1 to 6 carbon atoms, preferably methyl or ethyl, especially methyl. Specific examples of compounds which are suitable to copolymerize with the vinylidene chloride are methyl acrylate, ethyl acrylate, butyl acrylate, methacrylic acid, methyl methacrylate, ethyl methacrylate and acrylonitrile. Among these compounds methyl acrylate is preferred.

As stated above the resinous copolymer is of a major proportion of vinylidene halide, usually vinylidene chloride, and a minor proportion of copolymerizable monomer. The copolymer generally contains between 75% and 95% by weight of vinylidene halide. Preferably, the copolymer contains about 80% by weight of vinylidene halide. The preferred copolymer is one of about 80 wt. percent of a vinylidene chloride and about 20 wt. percent of methyl acrylate.

Polymerizable open-chain conjugated hydrocarbon compounds which may be used in preparing the rubbery copolymers include the $C_4$–$C_6$ dienes and substituted dienes such as butadiene-1,3; 2-methyl butadiene-1,3; 2,3-dimethyl butadiene-1,3; 2-chloro-butadiene-1,3 and hexadiene-1,3, while the vinylidene halide compounds include vinylidene chloride and vinylidene fluorochloride, etc.

The rubbery copolymer of an open-chain conjugated diolefin hydrocarbon compound and a vinylidene halide is preferably a copolymer of butadiene-1,3 and vinylidene chloride. The rubbery conjugated diolefin-vinylidene halide copolymer should contain no less than about 55 parts and no more than about 65 parts by weight of copolymerized diolefin and no more than about 45 parts and no less than 35 parts by weight of copolymerized vinylidene halide. If less than about 55 parts of copolymerized diolefin are present the latex foam rubber is not sufficiently rubbery for foam rubber applications. While if less than about 35 parts of copolymerized vinylidene halide are present the good flame retardancy of the foam rubbers deteriorates to a point where the addition of larger amounts of vinylidene halide-copolymerizable monomer copolymer will not rectify it without causing the foam rubber to lose its rubbery properties. The total amount of resinous vinylidene halide-copolymerizable monomer copolymer added is generally from 10 to 35 parts by weight per 100 parts by weight of rubbery copolymer, with the smaller amounts being added when the rubbery copolymer contains the larger amounts of copolymerized vinylidene halide and the larger amounts being added when the rubbery copolymer contains the smaller amounts of copolymerized vinylidene halide. The general criterion for the resinous copolymer is the maintenance of the total halogen content in the total polymers in the latex foam rubber within the range of about 30 to 43 weight percent and preferably about 38%. Of the total resinous copolymer of vinylidene halide and copolymerizable monomer added to the rubbery copolymer, 5 to 20 parts and preferably 10 to 15 parts should be added prior to carrying out the agglomeration step in order to obtain best results.

It has been found that the addition of small amounts of materials such as antimony trioxide, ammonium phosphate, kaolin clay etc., during compounding supplies additional flame retardancy to the latex foam rubbers of this invention.

The adaptability of a synthetic latex to concentration is gauged by the percent solids obtainable on concentration of the latex to a viscosity of 12 poises as measured at 25° C. on a Brookfield Model LVF Viscometer using the #3 spindle at 30 r.p.m. Thus the term "12 poise solids content of at least 60%" means that the latex blend must be capable of being concentrated to at least 60 weight percent solids content when the viscosity reaches 12 poises.

The conventional techniques of aqueous emulsion polymerization may be employed in preparing the rubbery and resinous copolymer latices. Briefly, they consist of emulsifying in an aqueous medium the monomer mixture with an alkali metal soap of a $C_{12}$–$C_{18}$ acyclic monocarboxylic acid such as stearic or oleic acids, or an alkali metal soap of disproportionated rosin acids or synthetic emulsifiers such as alkyl aryl sulfonates, and initiating the polymerization reaction with a chemical such as potassium persulfate, hydrogen peroxide or an organic hydroperoxide such as cumene hydroperoxide, and regulating the molecular weight of the polymer so formed with a chain-transfer agent such as a $C_{10}$–$C_{16}$ mercaptan e.g. n-dodecyl mercaptan. When copolymerizing butadiene-1,3 and vinylidene chloride a conversion of about 80% for a 55/45 charge ratio of butadiene/vinylidene chloride is a desirable point at which to stop polymerization to obtain a polymer having a desirable balance of properties. When copolymerizing the vinylidene chloride with the copolymerizable monomer to form the resinous copolymer, a suitable latex may be prepared at 122° F. (50° C.) by employing 3 to 5 times the conventional amount of catalyst and stopping the reaction at about 70 to 90% conversion. It is preferred that this copolymerization occur at a temperature above 100° F.

The coagglomeration of the rubbery copolymer particles and the resinous copolymer particle may be carried out by any of the conventional methods, for example, freeze-thaw agglomeration, chemical agglomeration or pressure agglomeration, whereby the size of the particles in the latex mixture is increased sufficiently to enable subsequent concentration to a 12 poise solids content of at least 60% without causing the latex to coagulate. Concentration to 60 to 70% solids, as required for production of latex foam rubber may be accomplished by processes such as swept film evaporation, rotating disc concentration, or centrifuging and creaming. It is usually desirable to adjust the pH of the rubbery copolymer latex to a value between about 10 to 12 before blending with resinous latex and agglomerating. Addition to the latex mixture of about 0.5 to 2 parts by weight of latex solids of a soap such as potassium oleate before the agglomeration step is carried out, is often advisable to enhance the stability of the latex mixture to the conditions encountered during agglomeration.

After agglomerating the copolymer particles in the latex mixture, the mixture is blended with a further quantity of resinous copolymer of vinylidene halide and copolymerizable monomer and the blend is concentrated to the desired level. Minor proportions of a latex of another halogen in containing polymer such as poly-2 chlorobutadiene-1,3 and polyvinyl chloride may be included in the blend.

The concentrated latex blend may next be compounded by adding materials such as fillers, gelling agents, vulcanizing agents, accelerators, activators, etc., then foamed, gelled, and cured by conventional means. Of particular applicability to this invention is the additional incorporation of flame-retardant chemicals such as chlorinated wax, antimony trioxide, ammonium phosphate or less expensive materials such as aluminum silicate, clays such as kaolin, McNamee clay etc., which confer further flame retardancy to the latex foam rubber products. The latex foam rubbers may also be treated by soaking in phosphate-containing solutions, ammonium sulfamate solutions, phenol-formaldehyde and melamine-formaldehyde resin dispersions etc. to further enhance their flame-retardancy.

Where reference is made in the example to ASTM D-1692–59T "Tentative Method of Test For Flammability of Plastics, Foams and Sheeting," the following notations apply:

The specimens 2 x 6 x ½ inches, are supported by hardware cloth, for example, a wire gauze, horizontally along their entire length. The height of the supporting gauze is adjusted so as to be ½ inch above the top of a Bunsen burner wing top. The burner is adjusted to give a blue flame whose visible portion is 1½ inches high, and the flame is set under one edge. At the end of 1 minute, or when the flame reaches the first inch gauge mark, the flame is removed.

If no flame or progressive glow is observed, the result is judged to be "non-burning" by this test. If the specimen continues to burn, the time (in seconds) of burning the 4 inches distance from the one inch gauge mark to the 5 inches gauge mark is measured, and the burning rate in inches per minute is calculated by dividing the time in seconds into 240. If the specimen shows evidence of ignition or burns on exposure to the flame but does not burn past the 5 inches second gauge mark, it is judged to be "self-extinguishing" by this test.

The invention will now be further described with reference to the following examples, which are intended to illustrate the invention, but in no way limit it.

EXAMPLE 1

A latex containing a rubber copolymer of butadiene-1,3 and vinylidene chloride was prepared using the following emulsion polymerization recipe:

| | Parts |
|---|---|
| Butadiene-1,3 | 55 |
| Vinylidene chloride | 45 |
| t-dodecyl mecaptan | 0.03 |
| Potassium oleate | 3.6 |
| Daxad 30 (a) | 0.1 |
| Trisodium phosphate | 0.4 |
| Potassium chloride | 0.3 |
| Potassium salt of EDTA (b) | 0.05 |
| $Na_2S_2O_4 \cdot 2H_2O$ | 0.03 |
| Water | 130 |
| $FeSO_4 \cdot 7H_2O$ | 0.008 |
| Sodium formaldehyde sulfoxylate | 0.032 |
| Trisodium phosphate | 0.032 |
| Di-isopropylbenzene hydroperoxide | 0.35 |

The reaction was conducted at 45° F. (7° C.) and was taken to 77 percent conversion of the monomers to polymer in about 13 hours, at which time 0.2 part of diethyl hydroxylamine was added to stop the polymerization. The unreacted monomers were then removed by conventional flashing and steam distillation methods. By analysis, the copolymer was found to contain about 23 to 24% chlorine.

A second latex containing a resinous copolymer of vinylidene chloride and methyl acrylate, was prepared at 122° F. using the following recipe:

| | Parts |
|---|---|
| Vinylidene chloride (inhibitor free) | 80 |
| Methyl acrylate | 20 |
| Calsoft F-90 (c) | 3.0 |
| Triton X-200 (d) | 1.5 |
| Daxad 30 | 0.5 |
| Potassium chloride | 0.3 |
| Water | 130 |
| $K_2S_2O_8$ | 0.3 |

The polymerization of the resin was taken to 80 percent conversion of the monomer to polymer in about 9 hours. The reaction was terminated by adding 0.2 part of diethyl hydroxylamine. The unreacted monomers were then removed by conventional flashing and steam distillation methods. By analysis, the resinous copolymer was found to contain about 56% chlorine.

The above latex of the polymer of vinylidene chloride and methyl acrylate remained fluid after over 200 days storage whereas the polyvinylidene chloride latex prepared in accordance with Example 1 of application No. 487,902 began to gel after about 100 days storage.

(a) Daxad 30 is the trade name for the sodium salt of a polyelectrolyte.

(b) EDTA is ethylene diamine tetracetic acid.

(c) Calsoft F-90 is a linear sodium alkylate sulphonate which is an anionic emulsifier.

(d) Triton X-200 is a sodium salt of an alkyl aryl polyether sulfonate and is an anionic emulsifier.

The resinous copolymer was mixed with the rubber butadiene-vinylidene chloride copolymer latex in a total solids ratio of 15 parts by weight of resinous copolymer per 100 parts by weight of rubbery copolymer. 1 part of potassium oleate was added to the mixture of latices. The pH of the resulting mixture was 10.5. The average size of the particles in the latex mixture was increased by a coagglomeration step effected by freezing the latex at about −30° F. (−34° C.) for about 2½ minutes and then thawing at 120° F. (49° C.).

To the coagglomerated rubbery copolymer resinous copolymer latex were added 10 additional parts by weight of solids of vinylidene chloride-methyl acrylate copolymer latex. This second latex blend was then concentrated to 65% by weight solids which is equivalent to a 12 poise solids content of 63%. Where referred to in this and subsequent examples, the latex at this stage will be referred to as "the final high solids latex blend."

A sample of latex foam rubber was prepared from a portion of this latex using the following formulation for compounding:

| | Parts |
|---|---|
| Latex | 100 |
| Zinc diethyl dithiocarbamate | 0.75 |
| Zinc 2-mercaptobenzothiazole | 1.0 |
| Sulfur | 2.25 |
| Antioxidant "2246" (e) | 1.5 |
| Nalcure AR (f) | 2.0 |
| Zinc oxide (water dispersion) | 4.0 |

These ingredients were intimately blended with the latex, the container covered, and the compound allowed to mature for 20 hours in an air-conditioned room maintained at 77° F. and 50% relative humidity.

The compound was then foamed and gelled in an N-50 Model Hobart Mixer after adding the following additional ingredients in the order indicated to complete the compounding:

| | Parts |
|---|---|
| Potassium oleate soap | 0.3 |
| Nalcure AR (f) | 1.0 |
| Sodium silicofluoride (water dispersion) | 2.0 |

Within 1 minute of stopping the mixer, a mould measuring 8 x 6 x 1 inches was filled and closed. After the latex compound had gelled, the mould was placed in a steam oven for 25 minutes. The cured latex foam rubber was then stripped from the mould, washed and dried.

(e) Antioxidant "2246" is a trademark for a 2,2-methylene-bis-4-methyl-6-tertiary butyl phenol.

(f) Nalcure AR is a high molecular weight polyalkylene polyamine.

The foam rubber speciment produced by the above method was compared to a standard butadiene-styrene copolymer latex foam rubber and to a sponge prepared from a concentrated latex of the above prepared butadiene-vinylidene chloride copolymer. A comparison of the physical and flame retardance properties of the three specimens is shown in Table I.

TABLE I

| Latex foam rubber prepared from— | Percent chlorine in polymer | Tensile (p.s.i.) | Percent elongation | Density, lbs./cu. ft. | Percent compression set | Flame retardance |
|---|---|---|---|---|---|---|
| A. Butadiene-styrene (72/78 copolymer rubber and polystyrene latex blend-ratio as in C. | 0 | 6.0 | 155 | 6.0 | 4.0 | Charred. |
| B. Butadiene-vinylidene chloride (55/45) copolymer latex. | 25 | 4.2 | 137 | 9.6 | 9.3 | Fair. |
| C. Product of Example I | 35 | 7.1 | 210 | 6.84 | 8.6 | Good. |

EXAMPLE 2

A further sample of final high solids latex blend of Example 1 was formed into foam using the following formulation for compounding:

| | Parts |
|---|---|
| Latex | 100 |
| Zinc diethyl dithiocarbamate | 0.75 |
| Zinc 2-mercaptobenzothiazole | 1.0 |
| Sulfur | 2.25 |
| Antioxidant "2246" | 1.5 |
| Nalcure AR | 1.0 |
| Zinc oxide (water dispersion) | 1.0 |

These ingredients were intimately blended with the latex, the container covered, and the compound allowed to mature for 20 hours in an air-conditioned room maintained at 77° F. and 50% relative humidity.

The compound was then foamed and gelled in an N-50 Model Hobart mixer after adding the following additional ingredients:

| | |
|---|---|
| Potassium oleate | 0.25 |
| Nalcure AR | 0.5 |
| Zinc oxide (water dispersion) | 0.5 |
| Sodium silicofluoride (water dispersion) | 0.5 |

Within 1 minute of stopping the mixer, a mould measuring 8 x 6 x 1 inches was filled and closed. After the latex compound had gelled, the mould was placed in a steam oven for 25 minutes. The cured latex foam rubber was then stripped from the mould, washed and dried.

The physical properties of this foam are set out in Table II.

TABLE II

| | |
|---|---|
| Percent chlorine in polymer | 35 |
| Tensile (p.s.i.) | 11.1 |
| Percent elongation | 263 |
| Density of foam lbs./cu. ft. | 8.80 |
| Percent compression set | 15.7 |
| Flame retardance | Good |

EXAMPLE 3

The process of Example 1 was repeated substituting for the 80/20 copolymer latex of vinylidene chloride and methyl acrylate, copolymers containing 85 parts vinylidene chloride and 15 parts methyl acrylate, and 90 parts vinylidene chloride and 10 parts methyl acrylate. In each case the foams produced from the final latex blend had good flame retardance.

EXAMPLE 4

A series of latex foam rubbers was prepared and evaluated for flame retardance and burning rate by ASTM method D–1692–59T. These samples ranged from foam rubbers having no flame retardance and a high burning rate to those having positive flame retardance and ratings of "non-burning." All samples were prepared by the compounding procedure set out in Example 1 with deviations being noted.

The results are summarized in Table III.

to the present invention, due to degradation of the latex foam rubber of application No. 487,902 during the drying step.

To indicate the heat stability of the foams using the resinous copolymers of the present invention as opposed to those formed using the resinous homopolymers of vinylidene chloride, the above samples were subjected to temperatures of 100° C. After approximately 5 minutes, the sample prepared according to Example 1 of copending application No. 487,902 had a deep brown color and the surfaces of the foam had become harder, whereas the sample of the present invention took almost 2 hours to become as brown as the other sample was when stripped from the mould and 8 hours to become as brown as the other sample was after 5 minutes exposure to the heat.

To indicate the stability of U.V. light of the foams of the present invention as opposed to those formed using homopolymers of vinylidene chloride, the above samples were subjected to the same intensity of U.V. light. After ap-

TABLE III

| Sample | Latex from which foam is prepared | Foam rubber density, lbs./cu. ft. | Flame retardance | Burning rate, inches |
|---|---|---|---|---|
| A | Butadiene-styrene (72/28) described in Example 1 | 6.0 | None | 8 |
| B | Natural latex | 6.2 | do | 6 |
| C | Copolymer of butadiene-vinylidene chloride (64/36) prepared in similar manner to 55/45 copolymer in Example 1 (no blended or coagglomerated resin) | 8.1 | do | 4 |
| D | Copolymer of butadiene vinylidene chloride (55/45) described in Example 1 (no coagglomerated or blended resin) | 9.6 | do | 1.6 |
| E | A latex blend of 100 parts of the 55/45 copolymer plus 15 parts of 80/20 resinous vinylidene chloride methyl acrylate latex, the blend being coagglomerated (no further resin blended) | 8.3 | do | 1.1 |
| F | The product of Example 1 | 6.8 | Yes | (1) |
| G | The product of Example 2 | 8.8 | Yes | (1) |
| H | The product of Example 3 with 90/10 ratio | 7.6 | Yes | (1) |
| I | The product of Example 3 with 85/15 ratio | 7.3 | Yes | (1) |

[1] Non-burning.

EXAMPLE 5

A sample of flame-retardant latex foam was prepared from vinylidene chloride homopolymer in the manner described in Example 1 of application No. 487,902, employing a latex of a copolymer of butadiene-1,3 and vinylidene chloride (55/45) blended and coagglomerated with 15 parts per 100 parts of butadiene-1,3-vinylidene chloride copolymer of the vinylidene chloride homopolymer, followed by blending with a further 10 parts of vinylidene chloride homopolymer resin.

After formation into a foam in the manner described in the said example, the foam after drying at 180° F. (70° C.), had a brown coloration, indicating some degradation of the vinylidene chloride homopolymer.

The foam prepared according to Example 1 of this application after the drying step (4 hours at 180° F. (70° C.)) was by contrast, white and showed no brown discoloration, indicating no degradation.

A comparison of the physical properties of each of these samples showed the results set forth in the following Table IV.

TABLE IV

| Sample | Density, lbs./cu. ft. | Tensile (p.s.i.) | Percent elongation | Percent compression set |
|---|---|---|---|---|
| Example 1 of application No. 487,902 | 8.8 | 9.4 | 246 | 13.6 |
| Example 1 of present application | 8.8 | 11.1 | 283 | 8.6 |

Since the samples have the same density one would expect them to have almost identical physical properties, but as can be seen from the above table, the foam rubber produced from the vinylidene chloride homopolymer has inferior physical properties to that produced according proximately 5 minutes the sample of the earlier application was a deep brown color, whereas exposure of about an hour was necessary before the sample of the present invention started to brown.

What is claimed is:

1. A composition comprising a latex foam rubber prepared by (a) blending (1) an aqueous latex of particles of a resinous copolymer of a vinylidene halide and methyl acrylate, said methyl acrylate forming no less than 5 and no more than 25 parts by weight per 100 parts by weight of said resinous copolymer, with (2) an aqueous latex of particles of a rubbery copolymer of a $C_4$–$C_6$ conjugated diolefin hydrocarbon compound and a vinylidene halide monomer in which the vinylidene halide forms no more than 45 parts and no less than 35 parts by weight per 100 parts by weight of the rubbery copolymer, said resinous copolymer forming no less than 5 parts and no more than 20 parts by weight per 100 parts by weight of the total polymer in the latex blend, (b) subjecting the foregoing latex blend to a coagglomeration treatment to form larger particles composed of resinous and rubbery particles, (c) next adding sufficiently more latex of said resinous copolymer to the coagglomerated latex blend to provide a final latex blend in which the resinous copolymer forms no less than 10 parts and no more than 35 parts by weight per 100 parts by weight of total polymer in the final latex blend, then (d) concentrating the final latex blend to a 12 poise solids content of at least 60% and then (e) compounding, foaming, gelling and vulcanizing the concentrated latex.

2. The composition of claim 1 wherein the vinylidene halide wherever used is vinylidene chloride.

3. The composition of claim 2 wherein the rubbery copolymer is a copolymer of butadiene-1,3 and vinylidene chloride.

4. The composition of claim 3 wherein the resinous copolymer comprises about 20 parts by weight of copolymerized methyl acrylate.

5. The composition of claim 3 wherein the halogen content of the total polymers is about 38% by weight.

References Cited

UNITED STATES PATENTS 3,393,166  7/1968  Rupar _____ 260—2.5 L

FOREIGN PATENTS 629,640  10/1963  Belgium _____ 260—2.5 FP

JOHN C. BLEUTGE, Primary Examiner

W. J. BRIGGS, Sr., Assistant Examiner

U.S. Cl. X.R.

260—2.5 F, 2.5 H, 29.7 UA, 890